March 17, 1925.

A. T. NOGRADY 1,529,804

DIFFERENTIAL GEARING

Filed July 8, 1921

Inventor

An Dor. T. Nogrady

By Arthur C. Brown.

Attorney

March 17, 1925.
A. T. NOGRADY
1,529,804
DIFFERENTIAL GEARING
Filed July 8, 1921
2 Sheets-Sheet 2
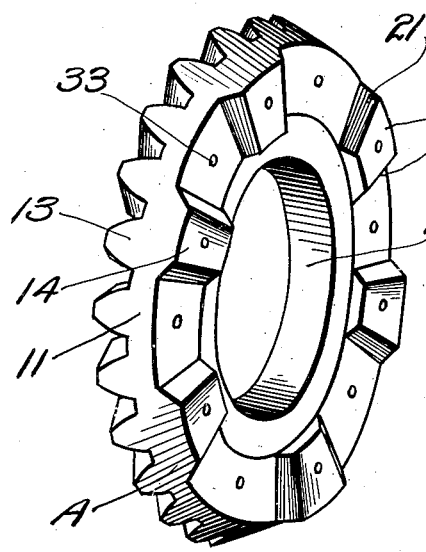
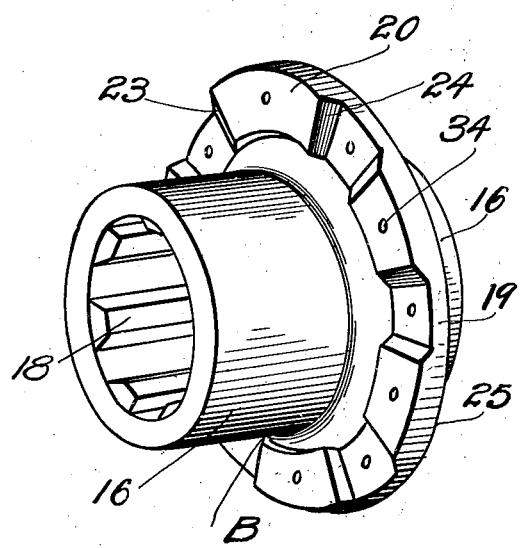
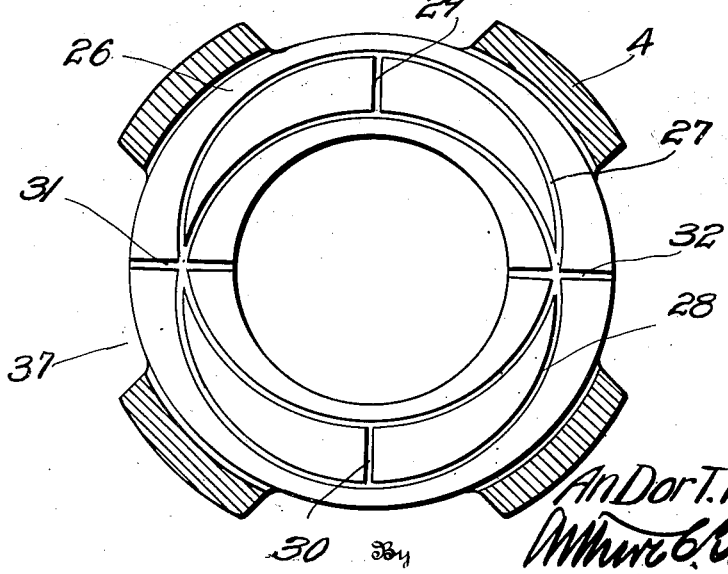
Inventor
AnDor T. Nogrady
By Arthur C. Brown
Attorney Patented Mar. 17, 1925.

1,529,804

UNITED STATES PATENT OFFICE.

ANDOR T. NOGRADY, OF RIVERSIDE, ILLINOIS, ASSIGNOR TO THE NOGRADY DIFFERENTIAL COMPANY, OF WICHITA, KANSAS, A CORPORATION OF WEST VIRGINIA.

DIFFERENTIAL GEARING.

Application filed July 8, 1921. Serial No. 483,158.

*To all whom it may concern:*

Be it known that I, ANDOR T. NOGRADY, a citizen of the United States, residing at Riverside, in the county of Cook and State of Illinois, have invented certain new and useful Improvements in Differential Gearing; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to locking differential gearing and particularly to a mechanism utilized for driving aligning separated parts or sections of a driven axle of a motor vehicle whereby the driving power may be applied through the axle members to the ground wheels and whereby variation in the speed of the respective wheels of the vehicle is permitted when deviating from a straight course, the construction being such that when either wheel loses traction, a thrust within the gearing effects an engagement with the axle members so that they are driven as a unit.

In the event, however, that one wheel is relatively retarded and the other is relatively advanced, as in the case when differentiating, the engagement of the gears is released so that a free acting differential movement is permitted.

One of the objects of the invention is to provide a differential gearing which generically conforms to the conventional embodiment of a differential gearing but which includes means for engaging certain of the parts together in an efficient and convenient manner for the purpose specified.

The invention contemplates the provision of means for shifting the thrusts of certain elements so that the aligning members of a split axle may be driven as a single axle or so that the axle members may be permitted to differentiate.

The general embodiment of my invention is disclosed in my Patent No. 1,361,895, December 14, 1920. In that patent the axle members or thrust acutators control the thrusts by certain cam devices specifically illustrated as spiral splines.

In the present invention the cams are shown as applied to the exterior portions of the thrust actuators and co-operate with the housed gears of the differential gearing so that the thrusts may be controlled within the differential housing to cause the two axle members to move together at the speed of the driving member (which may be the housing) or to differentiate. The same generic principle, however, present in my Patent No. 1,361,895, prevails throughout the present application.

In the drawings,

Fig. 2 is a detail perspective view of one of the gears co-operating with a thrust actuator.

Fig. 3 is a detail perspective view of one of the thrust actuators, and

Fig. 4 is a transverse sectional view through the gear housing, showing one end of the housing in elevation to illustrate the arrangement of the lubricating grooves.

Figure 1:
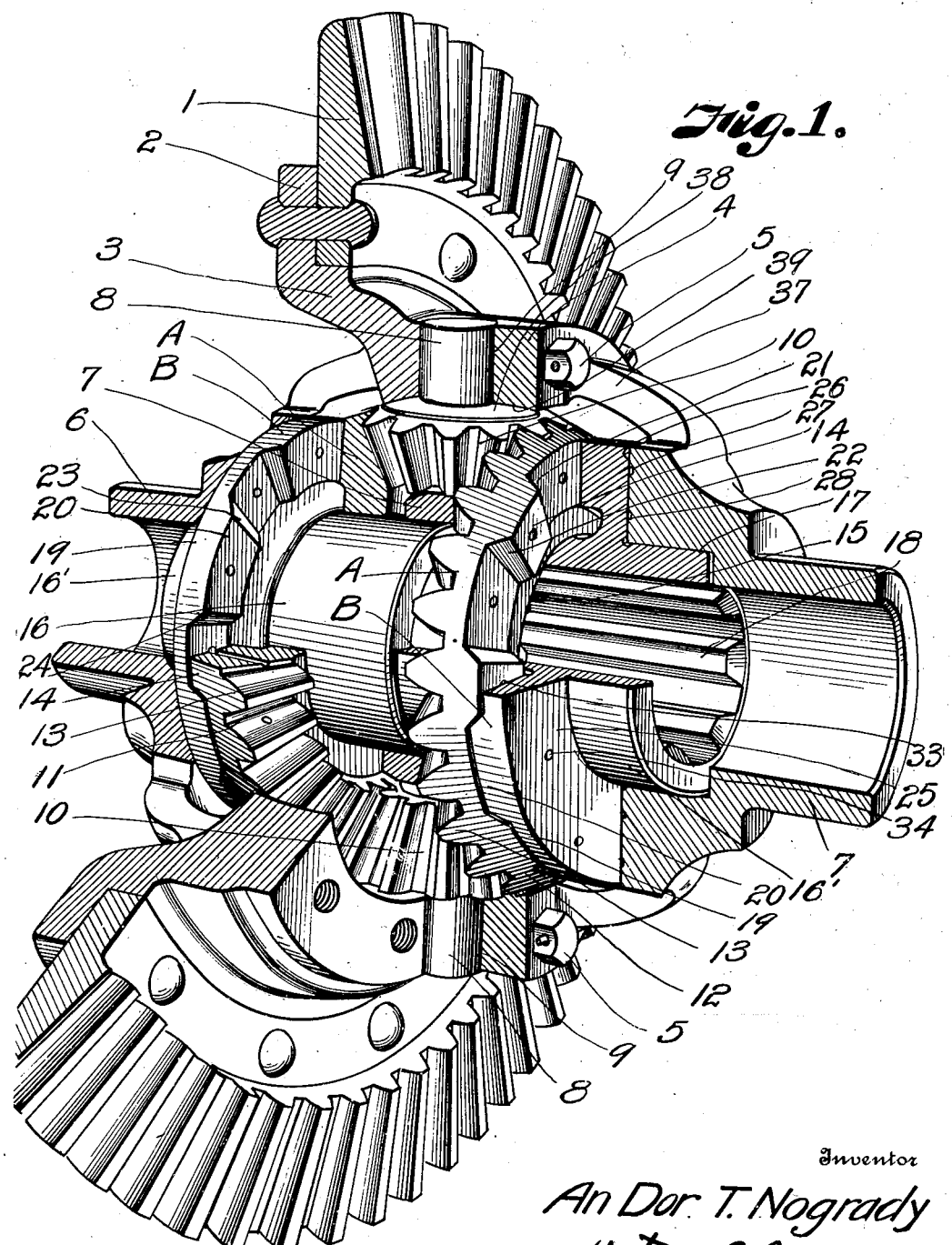
Fig. 1 is a perspective view of certain of the gear elements and part of the housing.

Referring now to the drawings by the reference numerals:

1 designates a master gear suitably fastened to the flange 2 on the member 3 of the two-part housing consisting of the member 3 and the member 4. The two members 3 and 4 are fastened together by suitable fastening devices, as bolts 5 and when brought together, form a housing or casing for the gears, pinions and thrust members of the locking differential.

The members 3 and 4 are provided with oppositely disposed sleeves 6 and 7 to receive the complementary parts of the axle (not shown), it being understood that the differential operates with a split axle as is common practice.

Within the housing is a ring 7 having radial arms 8, which are received in recesses 9 in the housing and which constitute a spider, the radial arms 8 receiving the pinions 10, which mesh with the driven members A—A comprising gears 11 and 12. The gears 11 and 12 are provided with beveled teeth 13 on one face and with cams 14 on the opposite face, the gears being in the form of rings and having central openings 15 receivable upon the tubular portions 16 of the axle receiving members B—B constituting thrust members. The axle members are in the form of tubes or cylindrical members and have tubular portions 16' extending into the recesses 17 of the housing. The tubular members are provided with splines 18 to receive correspondingly splined ends of the respective axle halves (not shown), the axle halves being splined to the thrust members B—B so as to rotate therewith.

Intermediate the ends of the tubular portions of the axle-receiving members B—B are collars 19, having on their inner faces cams 20, which alternate with the cams 14 on the gear. The cams 14 are provided with inclined ends 21 and 22 adapted to contact with inclined ends 23 and 24 of the cams 20 on the thrust members 19 and are adapted to ride one on the other so as to impart a longitudinal thrust to the thrust members 19. The thrust set up between the gears and the thrust members will tend to force the rear faces 25 of the thrust members against the thrust faces 26 in the housing so as to lock all of the parts together when the motor vehicle is driven in a straight line but when differentiating, the wheel scribing the greatest arc, or the outside wheel in making a turn, will relieve itself of thrust and be permitted to rotate faster than the inner wheel.

In order to provide for lubrication between the outer faces of the thrust members and the thrust faces of the housing I have provided the thrust faces 26 of the housing with intercommunicating grooves consisting of two circular grooves 27 and 28, eccentric to the axis or center of the housing and eccentric to one another. The grooves are shown as communicating one with the other by the cross grooves 29 and 30 at diametrically opposite points and midway between these points are additional radial grooves 31 and 32 which extend from the inner edges of the clutch faces 26 to the perimeter thereof and the oil is adapted to communicate with said grooves through openings 33 in the gears and openings 34 in the thrust members. The pinions 10 are also provided with clutch faces 35 which are adapted to bear against clutch faces 36 on the housing, as clearly seen in Fig. 2.

As the gears rotate about their axes, the meshing teeth of the driving and driven gears will act as geared pumps to squeeze the lubricant through the openings 33 and 34 into the grooved portions of the clutch faces on the housing so that a lubricating system will be provided, insuring feeding of the lubricant into the grooves of the clutch faces. The lubricant may circulate around the grooves and intermittently be forced out into the gear case through the radial grooves 31 and 32. It will, therefore, be seen that a film of lubricant may at all times be provided between the clutch faces so as to prevent grinding or abrading of the clutch faces when in action.

It will also be apparent that when the parts are properly assembled and the vehicle is traveling in a straight line and the gear housing is rotating, the pinions are carried with it and impart equal rotative movement to the gears 11 and 12 and through them to the axle members which carry the thrust members so that the power factor is divided between the two members of the split axle and each wheel receives one-half of the developed power communicated to the gear 1.

If the vehicle deviates from a straight line as, for example, in making a turn, the outside wheel may increase its speed, allowing the inside gear 11 or 12, as the case may be, to rotate faster than its complementary gear member. The pinions will tend to force the gears 11 and 12 apart and also tend to move radially with reference to the axle shaft and longitudinally with reference to their spider shafts. The thrust set up by such a tendency will cause the faces of the complementary clutch members to bind against the clutch faces and the housing so that all of the gears will engage the housing, thus producing the effect of a solid axle. Therefore, all the power generated in the gear 1 will be communicated to the wheel having traction and no loss of power will take place as would be the case if the wheel losing traction were permitted to spin idly, taking power and expending it in more than useless energy, destroying both tire and roadbed.

It will be apparent, of course, that suitable lubricating openings may be provided wherever expedient. The gear housing consisting of the members 3 and 4 may be provided with slots 37, through which a lubricant may enter from the gear case. The lubricant will distribute itself over the moving parts, the teeth of the intermeshing gears being particularly effective in forcing the lubricant through the openings 33 and 34 into the grooved portions of the clutch faces 26.

In the claims I shall refer to the binding of the thrust faces with their seats as "engagements" therewith, having in mind frictional engagement or positive engagement, dependent upon whether the thrust faces and seats are simply friction faces or constructed for positive engagement.

Attention is also called to the fact that the movement between the thrust elements and their thrust faces and between the gears and their pinions is very slight so that in practice, the actual shifting of the gears and pinions will be hardly perceptible, the only movement necessary being that which will effect a binding of the parts and when the gear is differentiating, relatively close clearances may be provided without causing the necessary thrusts to effecting binding of the parts.

It will also be apparent that the major portion of the thrusts will be exerted between the outer faces of the thrust members 19 and the clutch faces 26 and that in addition to the engagement between the clutch faces 25 and 26, there will be a tendency for the faces 38 of the pinions to bind against the faces 39 of the housing so that when the vehicle is moving in a straight line, there will be an effective locking of the parts.

What I claim and desire to secure by Letters-Patent is:

1. In a beveled differential gearing, a housing, pinion gears rotatable with the housing and rotatable about their own axes, aligning axle members within the housing having thrust collars, mating gears between the thrust collars and the pinions, spaced cams on the mating gears consisting of flat faces with beveled edges and alternating with like cams on the thrust members, and thrust faces on the housing to be engaged by the thrust faces on the thrust collars, the mating gears and thrust collars having oil passageways spaced at definite intervals to supply oil between the thrust collars and the thrust faces, and the thrust faces on the housing being provided with oil grooves.

2. In a differential gearing, a housing, pinion gears on the housing, tubular axle members within the housing and having thrust collars, mating gears meshing with the pinion gears, alternating projections on the mating gears and thrust collars and having beveled edges, the projections on the gears being interposed between the projections on the collars, clutch faces on the housing to be engaged by the collars, and means for creating a circulation of fluid through the mating gears and the collars and between the clutch faces and the collars.

In testimony whereof I affix my signature.

ANDOR T. NOGRADY.